July 29, 1941.  H. C. EDWARDS  2,250,448

SHAFT COUPLING

Filed Dec. 24, 1937

INVENTOR:
Herbert C. Edwards

HIS ATTORNEYS.

Patented July 29, 1941

2,250,448

UNITED STATES PATENT OFFICE 2,250,448

SHAFT COUPLING

Herbert C. Edwards, Massillon, Ohio, assignor to The Timken Roller Bearing Company, Canton, Ohio, a corporation of Ohio Application December 24, 1937, Serial No. 181,687

1 Claim. (Cl. 287—129)

This invention relates to couplings for rotary shaft sections. It has for its principal objects to devise a simple, economical and compact shaft coupling that will compensate for misalinement of the shaft sections, and will yield under excessive torque and that will provide for any degree of relative angular adjustment of said shaft sections. The invention consists in the shaft coupling and in the construction, combinations and arrangements of parts hereinafter described and claimed.

In the accompanying drawing, which forms part of this specification and wherein like symbols refer to like parts wherever they occur, Fig. 1 is a side elevation of a flexible angularly adjustable shaft coupling embodying my invention;

Figure 1:
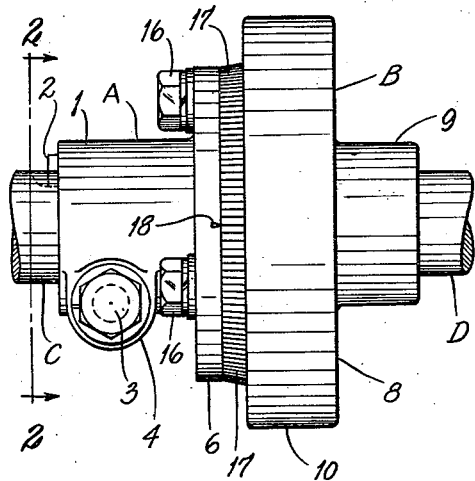
Figure 2:
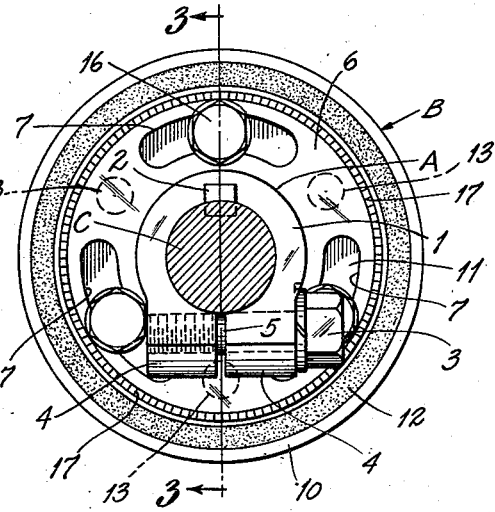
Fig. 2 is a transverse section on the line 2—2 in Fig. 1.

Referring to the accompanying drawing, my shaft coupling comprises driving and driven members A and B suitable for mounting on the adjacent ends of driving and driven shaft sections C and D, respectively. One of said coupling members, preferably the driving member A, comprises a hub portion 1 that is secured to the driving shaft C by means of a key 2 and by a clamp screw 3 that extends through perforated lugs 4 on the opposite sides of a longitudinal slot 5 in said hub portion. The hub portion of the driving member has an outstanding radial flange 6 thereon that is located near the drive shaft opposing end thereof and has a series of circumferentially spaced arcuate slots 7 therein concentric with the axis thereof.

The other or driven member B of said coupling preferably comprises an element having an annular web 8 with a hub 9 on one side thereof and an axially projecting peripheral flange 10 on the other side thereof, an annular element 11 secured within the peripherally flanged end of the shaft receiving member concentric therewith by an angular ring 12 of rubber interposed between and vulcanized to said web and said peripheral flange and the adjacent faces of said annular element. The annular element 11 has a series of circumferentially spaced threaded holes 13 extending therethrough parallel with the axes thereof, these holes and the arcuate slots 5 in the driving member A being spaced equidistant from the coupling axis.

Figure 3:
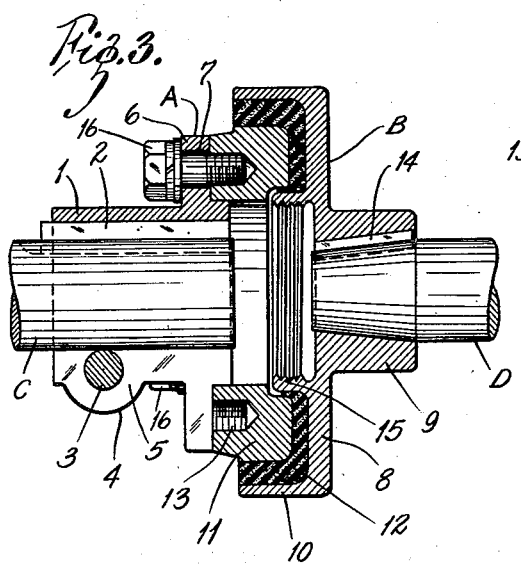
Fig. 3 is a central longitudinal section on the line 3—3 in Fig. 2.
Figure 4:
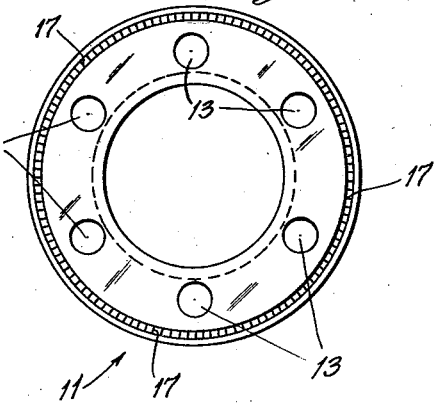
Fig. 4 is an outer end view of the ring element of the driven member of the coupling.

The hub portion 9 of the shaft receiving element of the driven coupling member B is secured to the tapered end of the driven shaft D by a key 14; and the web 8 of said element has an internally threaded axially projecting flange 15 on the peripherally flanged side thereof adapted to receive a suitable pulling implement (not shown). As shown in Fig. 3, the rubber element 12 is preferably extended between the flange 15 and the inner periphery of the ring 11.

The two members of the coupling are clamped together end to end by means of cap screws 16 that extend through the arcuate slots 5 in the driving member A and are threaded into the registering holes 13 in the ring element 11 of the driven member B. These screws firmly clamp the flange 6 of the driving member to the ring 11 of the driven member with the adjacent end of the hub 1 of said driven member supported in the opening in said ring. As shown in the drawing, there are six equally spaced holes 13 in the ring element 11 of the driven member and the driving element is provided with three equally spaced arcuate slots 5, each of which is long enough to register with any two adjacent holes in said element. With this arrangement, each arcuate slot 5 alines with one of the holes 13 in every possible relative angular position of the driving and driven members, thereby permitting said members to be locked together by the screws 16 in any desired degree of relative angular adjustment. To aid in adjusting the coupling, the ring of the driven member is provided with circumferentially spaced graduations 17 adapted to cooperate with an index mark 18 on the flange 6 of the driving member.

The hereinbefore described coupling has several advantages. It provides for any degree of relative angular adjustment of the two shaft sections; it accommodates itself to misalinement of the two shaft sections and it is adapted to yield under excessive torque or axial load vibration or shock; and the large section of rubber adjacent to the outer diameter of the coupling serves to reduce stresses in the rubber due to torque at the outer diameter thereof without increasing the diameter of the coupling.

The above coupling is designed particularly for use in changing the timing of the cam shaft of a fuel injection pump for Diesel engines to advance or retard the time at which the fuel injection commences, but it is also adapted for use with other devices wherein it is desired to advance or retard the driven element with respect to the driving element.

What I claim is:

A shaft coupling comprising driving and driven members having axial shaft receiving openings, one of said members having a series of circumferentially spaced holes therein parallel with the axis thereof and the other of said members having a series of circumferentially spaced arcuate slots therein concentric with the axis thereof, said holes and said slots being substantially equidistant from the axes of the respective members, each of said arcuate slots being long enough to register with any two adjacent holes, whereby each of said slots alines with at least one of said holes in every possible relative angular position of said members, and removable fasteners extending through the respective slots into the holes in register therewith.

HERBERT C. EDWARDS.